(12) United States Patent
Hokoi

(10) Patent No.: US 9,873,336 B2
(45) Date of Patent: Jan. 23, 2018

(54) HYBRID VEHICLE

(71) Applicant: TOYOTA JIDOSHA KABUSHIKI KAISHA, Toyota-shi, Aichi-ken (JP)

(72) Inventor: Koji Hokoi, Toyota (JP)

(73) Assignee: Toyota Jidoshi Kabushiki Kaisha, Toyota-shi, Aichi-ken (JP)

( * ) Notice: Subject to any disclaimer, the term of this patent is extended or adjusted under 35 U.S.C. 154(b) by 64 days.

(21) Appl. No.: 14/734,224

(22) Filed: Jun. 9, 2015

(65) Prior Publication Data
US 2015/0352962 A1  Dec. 10, 2015

(30) Foreign Application Priority Data
Jun. 10, 2014  (JP) ................................ 2014-119593

(51) Int. Cl.
| | | |
|---|---|---|
| *B60L 11/12* | (2006.01) | |
| *B60L 11/18* | (2006.01) | |
| *B60W 10/26* | (2006.01) | |

(52) U.S. Cl.
CPC ......... *B60L 11/123* (2013.01); *B60L 11/1809* (2013.01); *B60L 11/1861* (2013.01); *B60W 10/26* (2013.01); *Y02T 10/6217* (2013.01); *Y02T 10/705* (2013.01); *Y02T 10/7005* (2013.01); *Y02T 10/7044* (2013.01); *Y02T 10/7072* (2013.01); *Y02T 10/7077* (2013.01); *Y02T 90/14* (2013.01)

(58) Field of Classification Search
CPC .............. B60L 11/123; B60L 11/1861; B60L 11/1809; B60W 10/26
USPC ............................ 290/16; 180/65.29; 701/22
See application file for complete search history.

(56) References Cited

U.S. PATENT DOCUMENTS

| | | | |
|---|---|---|---|
| 2010/0010704 A1* | 1/2010 | Uchida | ................. B60L 3/0046 701/29.6 |
| 2012/0109442 A1 | 5/2012 | Kato et al. | |
| 2013/0006462 A1* | 1/2013 | Fleckner | ............... B60K 6/485 701/22 |
| 2013/0030635 A1* | 1/2013 | Morita | .................. B60K 6/445 701/22 |

(Continued)

FOREIGN PATENT DOCUMENTS

| | | |
|---|---|---|
| CN | 102858576 | 1/2013 |
| JP | 2011-93335 | 5/2011 |

(Continued)

*Primary Examiner* — Viet Nguyen
(74) *Attorney, Agent, or Firm* — Finnegan, Henderson, Farabow, Garrett & Dunner, LLP

(57) ABSTRACT

A hybrid vehicle includes an engine, a rotary electric machine, an electric power storage device, an electric power generation device, a switch, and an ECU. The switch is a switch operated by a user when the user requires recovery control to be executed or stopped. The recovery control is control for increasing the electric power storage amount of the electric power storage device by using the electric power generation device. The ECU is configured to select any one of a plurality of control modes that include a charge sustaining mode and a charge depleting mode, and control the hybrid vehicle in accordance with the selected control mode. The ECU is configured to select the charge depleting mode when the recovery control is requested to be stopped by using the switch during the execution of the recovery control.

9 Claims, 5 Drawing Sheets

(56) References Cited

U.S. PATENT DOCUMENTS

| | | | | |
|---|---|---|---|---|
| 2013/0293195 | A1* | 11/2013 | Ishii | H02J 7/0019 320/109 |
| 2014/0114513 | A1* | 4/2014 | Treharne | B60W 10/06 701/22 |
| 2014/0114514 | A1* | 4/2014 | Crombez | B60W 10/06 701/22 |
| 2014/0303819 | A1* | 10/2014 | Aoki | B60L 11/1861 701/22 |
| 2015/0048673 | A1* | 2/2015 | Chintala | B60L 1/00 307/9.1 |
| 2015/0191164 | A1* | 7/2015 | Kinomura | B60W 10/08 701/22 |
| 2015/0197162 | A1* | 7/2015 | Martin | B60L 11/1861 701/22 |
| 2015/0239460 | A1* | 8/2015 | Manickaraj | B60W 10/06 701/22 |
| 2015/0243151 | A1* | 8/2015 | Wright | G08B 21/14 340/425.5 |
| 2015/0336558 | A1* | 11/2015 | Yamazaki | B60K 6/442 701/22 |
| 2016/0001766 | A1* | 1/2016 | Mori | B60L 11/14 701/22 |
| 2016/0031430 | A1* | 2/2016 | Aoki | B60W 20/16 701/22 |
| 2016/0082946 | A1* | 3/2016 | Kodawara | B60K 6/28 701/22 |
| 2016/0107635 | A1* | 4/2016 | Kodawara | B60K 6/48 701/22 |
| 2016/0149420 | A1* | 5/2016 | Sasaki | B60L 11/1859 320/134 |
| 2016/0264124 | A1* | 9/2016 | Hotta | B60W 20/13 |
| 2016/0272220 | A1* | 9/2016 | Ichikawa | B60W 50/14 |

FOREIGN PATENT DOCUMENTS

| | | |
|---|---|---|
| JP | 2011-219039 A | 11/2011 |
| JP | 2013-049381 A | 3/2013 |
| JP | 2013-147206 A | 8/2013 |
| JP | 5370584 B2 | 9/2013 |
| KR | 10-2004-0045744 A | 6/2004 |
| WO | WO 2010/143281 A1 | 12/2010 |

* cited by examiner

HYBRID VEHICLE

INCORPORATION BY REFERENCE

The disclosure of Japanese Patent Application No. 2014-119593 filed on Jun. 10, 2014 including the specification, drawings and abstract is incorporated herein by reference in its entirety.

BACKGROUND OF THE INVENTION

1. Field of the Invention

The invention relates to the control of a hybrid vehicle on which a driving electric motor, an electric power storage device that supplies electric power to the driving electric motor, and an engine that is operated to charge the electric power storage device are mounted.

2. Description of Related Art

Japanese Patent Application Publication No. 2011-093335 discloses a hybrid vehicle in which the output of the engine is increased, compared to a case where a charging request from a user for increasing the electric power storage amount of an electric power storage device is not detected, when the charging request is detected so that the charging of the electric power storage device is promoted.

SUMMARY OF THE INVENTION (US, DE, CN, KR)

When the electric power storage device is charged by operating the engine in response to the charging request from the user, the user may require the charging of the electric power storage device to be stopped with an intention to limit the operation of the operating engine. The charging of the electric power storage device is requested to be stopped by the user operating a predetermined operation device such as a switch.

Even if the charging of the electric power storage device is stopped, however, the limitation of the operation of the engine that is intended by the user cannot be carried out in some cases when the operation of the engine continues in accordance with the state of the vehicle.

The invention provides a hybrid vehicle that limits the operation of the operating engine to suit a user's intention when the charging of an electric power storage device using the engine is requested to be stopped.

A hybrid vehicle according to a first aspect of the invention includes an engine (10), a rotary electric machine (30), an electric power storage device (70), an electric power generation device (20), a switch (150), and an ECU (200). The rotary electric machine (30) is configured to be a driving source for the hybrid vehicle. The electric power storage device (70) is configured to supply electric power to the rotary electric machine (30). The electric power generation device (20) is configured to generate electric power for charging the electric power storage device (70) by using the power of the engine (10). The switch (150) is a switch for a user to operate when the user requires recovery control to be executed or stopped. The recovery control is control for increasing an electric power storage amount of the electric power storage device (70) to an upper limit value by using the electric power generation device (20). The ECU (200) is configured to select any one of a plurality of control modes. The control modes include a charge sustaining mode and a charge depleting mode. The charge sustaining mode is a mode in which a reduction in the electric power storage amount is suppressed. The charge depleting mode is a mode in which the electric power of the electric power storage device (70) is consumed. The ECU (200) is configured to control the hybrid vehicle in accordance with the selected control mode. In addition, the ECU (200) is configured to select the charge depleting mode when the recovery control is requested to be stopped by using the switch (150) during the execution of the recovery control.

In the aspect described above, the ECU (200) may select the charge sustaining mode when the electric power storage amount reaches the upper limit value as a result of the execution of the recovery control.

In the aspect described above, the ECU (200) may select the charge sustaining mode when the recovery control is requested to be stopped by using the switch (150) after the electric power storage amount reaches the upper limit value as a result of the execution of the recovery control.

In the aspect described above, the ECU (200) may select any one of the charge sustaining mode and the charge depleting mode depending on a malfunctioning part of the hybrid vehicle when the electric power storage amount reaches the upper limit value during the execution of the recovery control and the malfunctioning part is present in the hybrid vehicle.

A hybrid vehicle according to a second aspect of the invention includes an engine (10), a rotary electric machine (30), an electric power storage device (70), an electric power generation device (20), a switch (150), and an ECU (200). The rotary electric machine (30) is configured to be a driving source for the hybrid vehicle. The electric power storage device (70) is configured to supply electric power to the rotary electric machine (30). The electric power generation device (20) is configured to generate electric power for charging the electric power storage device (70) by using the power of the engine (10). The switch (150) is configured to transmit a signal when the switch (150) is operated. The switch (150) is a switch operated by a user. The recovery control is control for increasing an electric power storage amount of the electric power storage device (70) to an upper limit value. The ECU (200) is configured to select any one of a plurality of control modes and control the hybrid vehicle in accordance with the selected control mode. The control modes include a charge sustaining mode and a charge depleting mode. The charge sustaining mode is a mode in which a reduction in the electric power storage amount is suppressed. The charge depleting mode is a mode in which the electric power of the electric power storage device is consumed. The ECU (200) is configured to receive the signal. The ECU (200) is configured to execute the recovery control when a first signal is received. The first signal is a signal for requesting recovery control to be executed. The ECU (200) stops the recovery control when a second signal is received. The second signal is a signal for requesting the recovery control to be stopped. The ECU (200) is configured to select the charge depleting mode when the second signal is received during the execution of the recovery control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
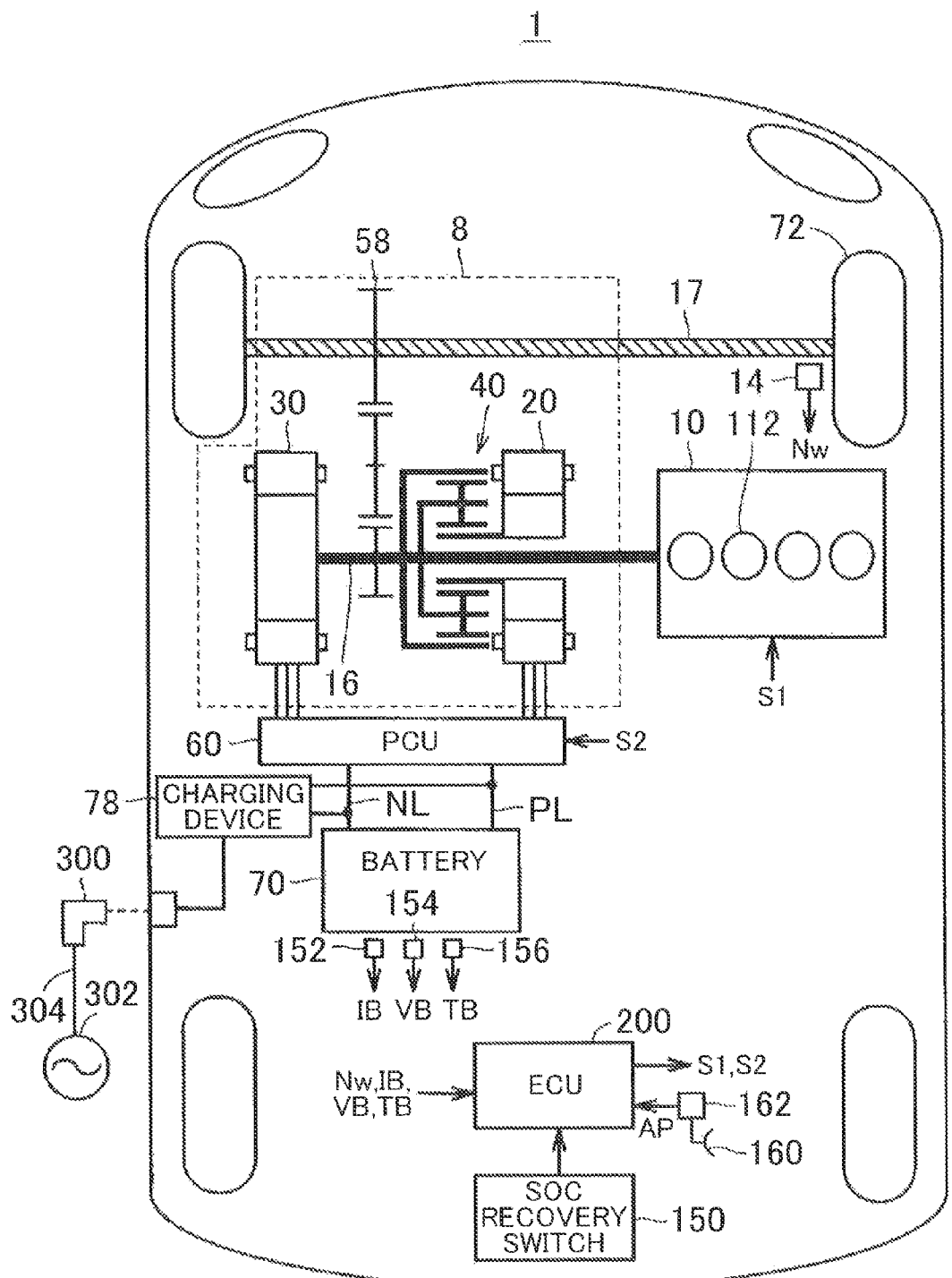
FIG. 1 is an overall block diagram of a vehicle.

Hereinafter, an embodiment of the invention will be described with reference to accompanying drawings. In the following description, like reference numerals will be used to refer to like parts sharing the same designations and functions. Detailed description thereof will not be repeated.

FIG. 1 is an overall block diagram showing a hybrid vehicle 1 (hereinafter, simply referred to as a vehicle 1) according to this embodiment. The vehicle 1 includes a transmission 8, an engine 10, a drive shaft 17, a power control unit (PCU) 60, a battery 70, drive wheels 72, a charging device 78, an SOC recovery switch 150, an accelerator pedal 160, and an electronic control unit (ECU) 200.

The transmission 8 includes an output shaft 16, a first motor generator (hereinafter, referred to as a first MG) 20, a second motor generator (hereinafter, referred to as a second MG) 30, a power split device 40, and a decelerator 58.

The ECU 200 receives various signals from various sensors such as a vehicle wheel speed sensor 14, a current sensor 152, a voltage sensor 154, a battery temperature sensor 156, and a pedal stroke sensor 162.

The vehicle 1 that has the above-described configuration travels by using the driving force that is output from at least one of the engine 10 and the second MG 30. The power that is generated by the engine 10 is divided into two paths by the power split device 40. One of the two paths is a path through which the power is transmitted to the drive wheels 72 via the decelerator 58 and the other path is a path through which the power is transmitted to the first MG 20.

The first MG 20 and the second MG 30 are, for example, three-phase rotary electric machines. The first MG 20 and the second MG 30 are driven by the PCU 60.

The first MG 20 has a function as a generator (electric power generation device) that generates electric power by using the power of the engine 10 which is divided by the power split device 40 and charges the battery 70 through the PCU 60. In addition, the first MG 20 rotates a crankshaft, which is an output shaft of the engine 10, by receiving electric power from the battery 70. In this manner, the first MG 20 has a function as a starter that starts the engine 10.

The second MG 30 has a function as a driving motor that applies a driving force to the drive wheels 72 by using at least one of the electric power which is stored in the battery 70 and the electric power which is generated by the first. MG 20. In addition, the second MG 30 has a function as a generator for charging the battery 70 through the PCU 60 by using the electric power that is generated by regenerative braking.

The engine 10, which is a gasoline engine that includes a plurality of (four in this embodiment) cylinders 112, is controlled based on a control signal S1 from the ECU 200. The type of the engine 10 is not particularly limited to what is illustrated in FIG. 1.

In the engine 10 that has the above-described configuration, the ECU 200 controls a fuel injection amount for each of the cylinders 112 by injecting an appropriate amount of fuel to each of the cylinders 112 and stopping the fuel injection to the cylinders 112 at an appropriate time.

The power split device 40 is configured to be capable of dividing the power that is generated by the engine 10 into the path leading to the drive shaft 17 through the output shaft 16 and the path leading to the first MG 20. A planetary gear mechanism that has the three rotating shafts of a sun gear, a planetary carrier, and a ring gear can be used as the power split device 40. For example, the engine 10, the first MG 20, and the second MG 30 can be mechanically connected to the power split device 40 by connecting a rotor of the first MG 20 to the sun gear, connecting the output shaft of the engine 10 to the planetary carrier, and connecting the output shaft 16 to the ring gear.

The output shaft 16 that is also connected to a rotor of the second MG 30 is mechanically connected to the drive shaft 17, which drives the drive wheels 72 to rotate, 110 through the decelerator 58. A transmission may also be incorporated between a rotating shaft of the second MG 30 and the output shaft 16.

The PCU 60 converts the DC electric power that is supplied from the battery 70 into AC electric power and drives the first MG 20 and the second MG 30. In addition, the PCU 60 converts the AC electric power that is generated by the first. MG 20 and the second MG 30 into DC electric power and charges the battery 70. For example, the PCU 60 is configured to include an inverter (not illustrated) for DC/AC electric power conversion and a converter (not illustrated) for the execution of DC voltage conversion between a DC link side of the inverter and the battery 70.

The battery 70, which is an electric power storage device, is a rechargeable DC electric power supply. For example, a secondary battery such as a nickel-hydrogen battery and a lithium-ion battery is used as the battery 70. The voltage of the battery 70 is, for example, approximately 200 V. The battery 70 may not only be charged by using the electric power that is generated by the first MG 20 and/or the second MG 30 as described above but also be charged by using the electric power that is supplied from an external electric power supply 302 (described later). The battery 70 is not limited to the secondary battery, and may be one capable of DC voltage generation, examples of which include a capacitor, a solar cell, and a fuel cell.

The current sensor 152, the voltage sensor 154, and the battery temperature sensor 156 are disposed in the battery 70. The current sensor 152 detects the current IB of the battery 70 and transmits a signal that shows the result of the detection to the ECU 200. The voltage sensor 154 detects the voltage VB of the battery 70 and transmits a signal that shows the result of the detection to the ECU 200. The battery temperature sensor 156 detects the battery temperature TB of the battery 70 and transmits a signal that shows the result of the detection to the ECU 200.

The ECU 200 estimates the electric power storage amount (hereinafter, referred to as the state of charge (SOC)) of the battery 70 based on the current IB, the voltage VB, and the battery temperature TB of the battery 70. For example, the ECU 200 may estimate an open circuit voltage (OCV) based on the current, the voltage, and the battery temperature and may estimate the SOC of the battery 70 based on the estimated OCV and a predetermined map. Alternatively, for example, the ECU 200 may estimate the SOC of the battery 70 by integrating the charging current and the discharging current of the battery 70 with each other.

While the vehicle 1 is stopped, the charging device 78 charges the battery 70 with the electric power that is supplied from the external electric power supply 302 by mounting a charging plug 300 on the vehicle 1. The charging plug 300 is connected to one end of a charging cable 304. The other end of the charging cable 304 is connected to the external electric power supply 302. A positive electrode terminal of the charging device 78 is connected to an electric power supply line PL that connects a positive electrode terminal of the ECU 60 and a positive electrode terminal of the battery 70 to each other. A negative electrode terminal of the charging device 78 is connected to an earth line NL that connects a negative electrode terminal of the PCU 60 and a negative electrode terminal of the battery 70 to each other. A charging method for supplying electric power from the external electric power supply 302 to the battery 70 of the vehicle 1 by non-contact electric power feeding such as a resonance technique and electromagnetic induction may be used in addition to or instead of a charging method for supplying electric power from the external electric power supply 302 to the battery 70 of the vehicle 1 by contact electric power feeding using the charging plug 300 or the like.

The vehicle wheel speed sensor 14 detects the rotation speed Nw of the drive wheels 72. The vehicle wheel speed sensor 14 transmits a signal that shows the detected rotation speed Nw to the ECU 200. The ECU 200 calculates a vehicle speed V based on the received rotation speed Nw. The ECU 200 may calculate the vehicle speed V based on the rotation speed of the second MG 30 instead of the rotation speed Nw.

The accelerator pedal 160 is disposed in a driver's seat. The pedal stroke sensor 162 is disposed in the accelerator pedal 160. The pedal stroke sensor 162 detects the stroke amount (amount of depression) AP of the accelerator pedal 160. The pedal stroke sensor 162 transmits a signal that shows the stroke amount AP to the ECU 200. An accelerator pedal depression force sensor for detecting the depression force of a passenger in the vehicle 1 with respect to the accelerator pedal 160 may be used instead of the pedal stroke sensor 162.

The ECU 200 generates the control signal S1 for controlling the engine 10 and outputs the generated control signal S1 to the engine 10. In addition, the ECU 200 generates a control signal S2 for controlling the PCU 60 and outputs the generated control signal S2 to the PCU 60.

The ECU 200 is a control device that controls the charging and discharging state of the entire hybrid system, that is, the battery 70, and the operation states of the engine 10, the first MG 20, and the second MG 30 so that the vehicle 1 can be operated at the maximum efficiency with the engine 10, the PCU 60, and the like controlled.

The ECU 200 calculates a vehicle power demand corresponding to the stroke amount AP of the accelerator pedal 160 disposed in the driver's seat and the vehicle speed V. The ECU 200 controls the torque of the first MG 20, the torque of the second MG 30, or the output of the engine 10 in accordance with the calculated vehicle power demand.

In this embodiment, the ECU 200 controls the PCU 60 and the engine 10 in any one of the control modes including a mode (hereinafter, referred to as a charge depleting (CD) mode) in which traveling is performed by consuming the electric power of the battery 70 with a reduction in the SOC of the battery 70 allowed (with the SOC not maintained) and a mode (hereinafter, referred to as a charge sustaining (CS) mode) in which the engine 10 is operated or stopped and traveling is performed with a reduction in the SOC of the battery 70 suppressed (including a case where the SOC is maintained).

The CD mode is not particularly limited to the non-maintenance of the SOC. For example, the CD mode may be a mode putting traveling during which the electric power of the battery 70 is consumed by EV traveling before traveling based on the maintenance of the SOC of the battery 70. In addition, the control modes may include a control mode other than the CD mode and the CS mode. The use of the control modes is not limited to the control of the vehicle 1 during traveling. The control modes are also used to control the vehicle 1 when the vehicle 1 is traveling and when the vehicle 1 is stopped.

The 200 performs, for example, automatic switching between the CD mode and the CS mode. For example, the ECU 200 controls the PCU 60 and the engine 10 in the CD mode in a case where the SOC of the battery 70 exceeds a switching threshold A and controls the PCU 60 and the engine 10 in the CS mode in a case where the switching threshold A exceeds the SOC of the battery 70. The ECU 200 may perform the switching between the CD mode and the CS mode in response to a user's operation of an operation member, such as a switch and a lever, which is disposed for control mode switching.

When the vehicle 1 is traveling in the CD mode, the operation of the engine 10 for electric power generation is suppressed (that is, a reduction in the SOC of the battery 70 is allowed). Accordingly, the SOC of the battery 70 is not maintained, the electric power of the battery 70 is consumed in response to an increase in the distance of the traveling, and the SOC of the battery 70 decreases.

In the CD mode, the ECU 200 controls the PCU 60 so that the vehicle 1 travels by using only the output of the second MG 30 insofar as the vehicle power demand does not exceed a start threshold Pr(1) of the engine 10.

In a case where the vehicle 1 travels by using only the output of the second MG 30 in the CD mode, the ECU 200 starts the engine 10 after the vehicle power demand exceeds the start threshold Pr(1) of the engine 10 (that is, after it is determined that it is impossible to satisfy the vehicle power demand with the output of the second MG 30 alone) and controls the PCU 60 and the engine 10 so that the vehicle power demand is satisfied by using the output of the second MG 30 and the output of the engine 10. In other words, the CD mode is a control mode in which the operation of the engine 10 for satisfying the vehicle power demand can be performed while the operation of the engine 10 for electric power generation is suppressed. Also, the engine 10 may be started in a case where the actual power of the vehicle 1, not the vehicle power demand, exceeds the start threshold of the engine 10. In addition, the ECU 200 stops the engine 10 in a case where the vehicle power demand is exceeded by a stop threshold of the engine 10 in the CD mode. The stop threshold in the CD mode, which is a value determined in advance, is equal to or less than the start threshold Pr(1).

During the traveling of the vehicle 1 in the CS mode, the operation of the engine 10 for electric power generation is allowed and a reduction in the SOC of the battery 70 is suppressed by maintaining the SOC of the battery 70 or recovering the SOC of the battery 70.

For example, the ECU 200 may execute charging and discharging control for the battery 70 so that the SOC of the battery 70 in the CS mode is within a predetermined control range (for example, within a control range including the switching threshold A described above) or may execute charging and discharging control for the battery 70 so that the SOC of the battery 70 maintains a predetermined target SOC (for example, the switching threshold A described above).

Examples of the charging control for the battery 70 include charging control using the regenerative electric power that is generated by the regenerative braking of the second MG 30 and charging control using the electric power that the first MG 20 generates by using the power of the engine 10.

In a case where the SOC of the battery 70 significantly exceeds a predetermined control range and a predetermined target SOC in the CS mode, the ECU 200 controls the PCU 60 so that the vehicle travels by using only the output of the second MG 30 insofar as the vehicle power demand does not exceed a start threshold Pr(2) of the engine 10.

In a case where the vehicle 1 travels by using only the output of the second MG 30 in the CS mode as described above, the ECU 200 starts the engine 10 after the vehicle power demand exceeds the start threshold Pr(2) of the engine 10 (that is, after it is determined that it is impossible to satisfy the vehicle power demand with the output of the second MG 30 alone) and controls the PCU 60 and the engine 10 so that the vehicle power demand is satisfied by using the output of the second MG 30 and the output of the engine 10. In other words, the CS mode is a control mode in which both the operation of the engine 10 for electric power generation and the operation of the engine 10 for satisfying the vehicle power demand can be performed. In addition, the ECU 200 stops the engine 10 in a case where the vehicle power demand is exceeded by the stop threshold of the engine 10 in the CS mode. The stop threshold in the CS mode, which is a value determined in advance, is equal to or less than the start threshold Pr(2).

In the description of this embodiment, the start threshold Pr(1) in the CD mode is higher than the start threshold Pr(2) in the CS mode and the stop threshold in the CD mode is higher than the stop threshold in the CS mode. Each of the start thresholds Pr(1), Pr(2) is a value that is equal to or less than the upper limit value of the output of the second MG 30 and is equal to or less than the upper limit value (Wout) of the output of the battery 70. In this case, a difference arises between the chances of running the engine 10 in the CD mode and the CS mode.

In addition, the ECU 200 executes SOC recovery control for increasing the value of the SOC of the battery 70 to a predetermined target by operating the engine 10 when an SOC recovery switch operation signal is received from the SOC recovery switch 150. The SOC recovery control is control executed when a CHG mode, which differs from the CD mode and the CS mode, is selected. The CHG mode differs from the CS mode in that a control target value for the SOC value is a full charging threshold C and the SOC value is increased to the full charging threshold C.

The SOC recovery switch 150 is a switch that is used when the user requires the SOC recovery control to be executed or stopped. The CHG mode is selected when the user operates the SOC recovery switch 150 (hereinafter, this operation will be referred to as an ON operation) while a control mode other than the CHG mode is selected. Then, the execution of the SOC recovery control is requested. Accordingly, the SOC value can be increased in advance against the selection of the CD mode. In this manner, the selection of the CD mode can continue for a certain period of time. The SOC recovery control is requested to be stopped when the user operates the SOC recovery switch 150 (hereinafter, this operation will be referred to as an OFF operation) while the CHG mode is selected.

Figure 2:
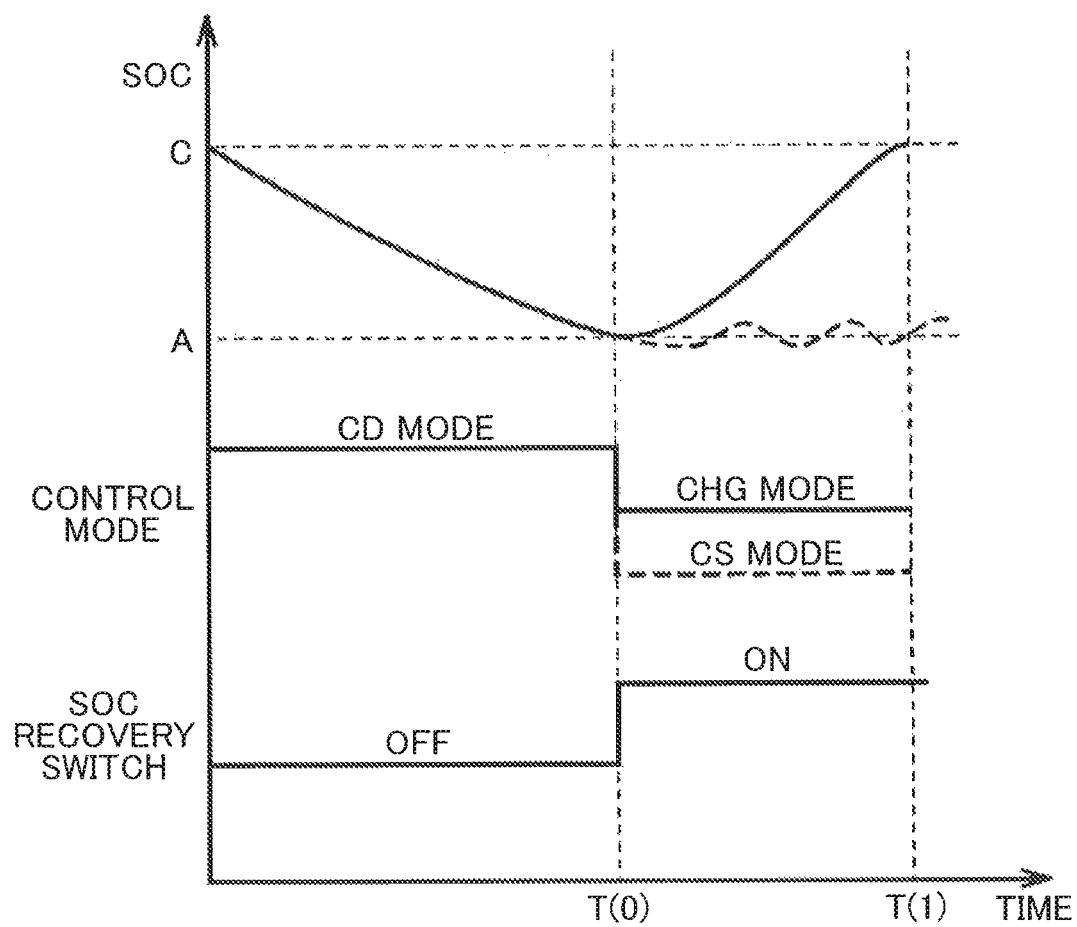
FIG. 2 is a diagram for showing an example of how the SOC changes during the execution of SOC recovery control.

Hereinafter, an example of how the SOC changes during the execution of the SOC recovery control (that is, while the CHG mode is selected) will be described with reference to FIG. 2. As an example, a case will be assumed where the traveling of the vehicle 1 in the CD mode is initiated in a case where the battery 70 is in a fully-charged state (state where the SOC of the battery 70 has reached the full charging threshold C) as illustrated in FIG. 2. The full charging threshold C is, for example, the upper limit value of the SOC of the battery 70 that is set in a case where the battery 70 is charged by using the external electric power supply 302.

In the case of the traveling in the CD mode, the electric power of the battery 70 is consumed because, for example, the frequency with which the EV traveling is performed is higher than the frequency with which HV traveling is performed. Accordingly, the SOC of the battery 70 is reduced with time.

In a case where the SOC recovery switch 150 is not operated until the SOC of the battery 70 reaches the switching threshold A at time T(0), the control mode is switched from the CD mode to the CS mode at the point in time when the switching threshold A is reached as illustrated by the dashed line in the graph in the middle of FIG. 2. Then, the SOC of the battery 70 is controlled with the switching threshold A being a target value, and thus the SOC of the battery 70 fluctuates with the threshold A being the center of the control as illustrated by the dashed line in the upper graph in FIG. 2.

In a case where the ON operation is performed on the SOC recovery switch 150 and an ON state occurs at time T(0), for example, the control mode is switched from the CD mode to the CHG mode. When the CHG mode is selected, the SOC of the battery 70 is controlled with the full charging threshold C, which is the upper limit value of the SOC of the battery 70, being a target value. Accordingly, the SOC of the battery 70 increases with time because of, for example, electric power generation using the power of the engine 10 as illustrated by the solid line in the upper graph in FIG. 2. The SOC recovery control continues at least until the SOC of the battery 70 reaches the full charging threshold C at time T(1).

During the execution of the SOC recovery control in the hybrid vehicle that has the above-described configuration, the user may require the SOC recovery control to be stopped, by performing the OFF operation on the SOC recovery switch 150, with an intention to limit the operation of the operating engine 10.

Even if the SOC recovery control is stopped, however, the operation of the engine 10 may continue in accordance with the state of the vehicle 1 if for example, the CS mode is selected thereafter. Accordingly, the limitation of the operation of the engine 10 that is intended by the user cannot be carried out in some cases.

The ECU 200 according to this embodiment is characterized by selecting the CD mode in a case where the SOC recovery control is requested to be stopped by using the SOC recovery switch 150 during the execution of the SOC recovery control.

In this case, the charging of the battery 70 using the power of the engine 10 is suppressed since the CD mode, in which the start threshold of the engine 10 with regard to the vehicle power demand is higher than in the CS mode and the electric power of the battery 70 is consumed, is selected in a case where the SOC recovery control is requested to be stopped by using the SOC recovery switch 150 during the execution of the SOC recovery control. Accordingly, the operation of the engine 10 can be more limited than in a case where the CS mode is selected.

In addition, in this embodiment, the ECU 200 selects the CS mode in a case where the execution of the SOC recovery control causes the SOC of the battery 70 to reach the full charging threshold C.

Figure 3:
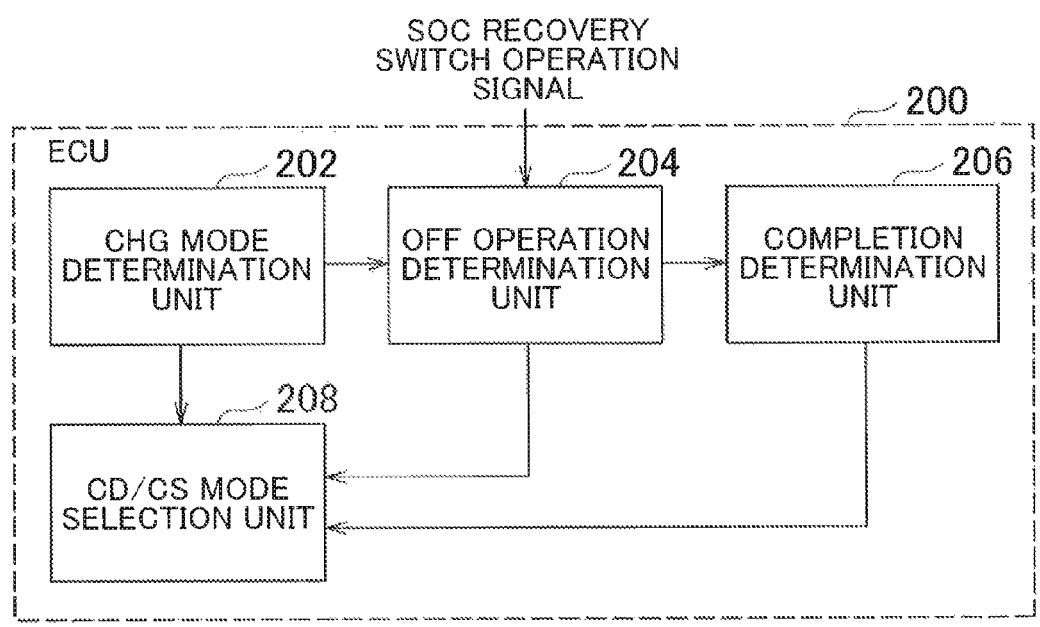
FIG. 3 is a functional block diagram of an ECU.

FIG. 3 is a functional block diagram of the ECU 200 that is mounted on the vehicle 1 according to this embodiment. The ECU 200 includes a CHG mode determination unit 202, an OFF operation determination unit 204, a completion determination unit 206, and a CD/CS mode selection unit 208. These components may be realized by software such as a program or may be realized by hardware.

The CHG mode determination unit 202 determines whether or not the CHG mode is selected. The CHG mode determination unit 202 determines whether or not the CHG mode is selected based on, for example, the state of a mode flag that is in an ON state when the CHG mode is selected. The CHG mode determination unit 202 determines that the CHG mode is selected in a case where, for example, the mode flag is in the ON state. The ON state of the mode flag occurs when, for example, the ON operation is performed on the SOC recovery switch 150. An OFF state of the mode flag occurs when, for example, the OFF operation is performed.

The OFF operation determination unit 204 determines whether or not the OFF operation has been performed based on the SOC recovery switch operation signal that is received from the SOC recovery switch 150. The OFF operation determination unit 204 determines that the OFF operation has been performed in a case where the SOC recovery switch operation signal is received from the SOC recovery switch 150 while the CHG mode is selected.

The completion determination unit 206 determines whether or not the charging of the battery 70 based on the SOC recovery control is completed. Specifically, the completion determination unit 206 determines that the charging of the battery 70 based on the SOC recovery control is completed in a case where the SOC of the battery 70 reaches the full charging threshold C during the execution of the SOC recovery control.

The CD/CS mode selection unit 208 selects a control mode based on the result of the determination by the CHG mode determination unit 202, the result of the determination by the OFF operation determination unit 204, and the result of the determination by the completion determination unit 206. Specifically, the CD/CS mode selection unit 208 selects the CD mode as the control mode in a case where it is determined by the CHG mode determination unit 202 that the CHG mode is selected and it is determined by the OFF operation determination unit 204 that the OFF operation has been performed on the SOC recovery switch 150. In the case of the determination that the CHG mode is selected, the CD/CS mode selection unit 208 selects the CS mode as the control mode, until it is determined by the completion determination unit 206 that the SOC recovery control is completed, in a case where it is not determined by the OFF operation determination unit 204 that the OFF operation is performed on the SOC recovery switch.

Figure 4:
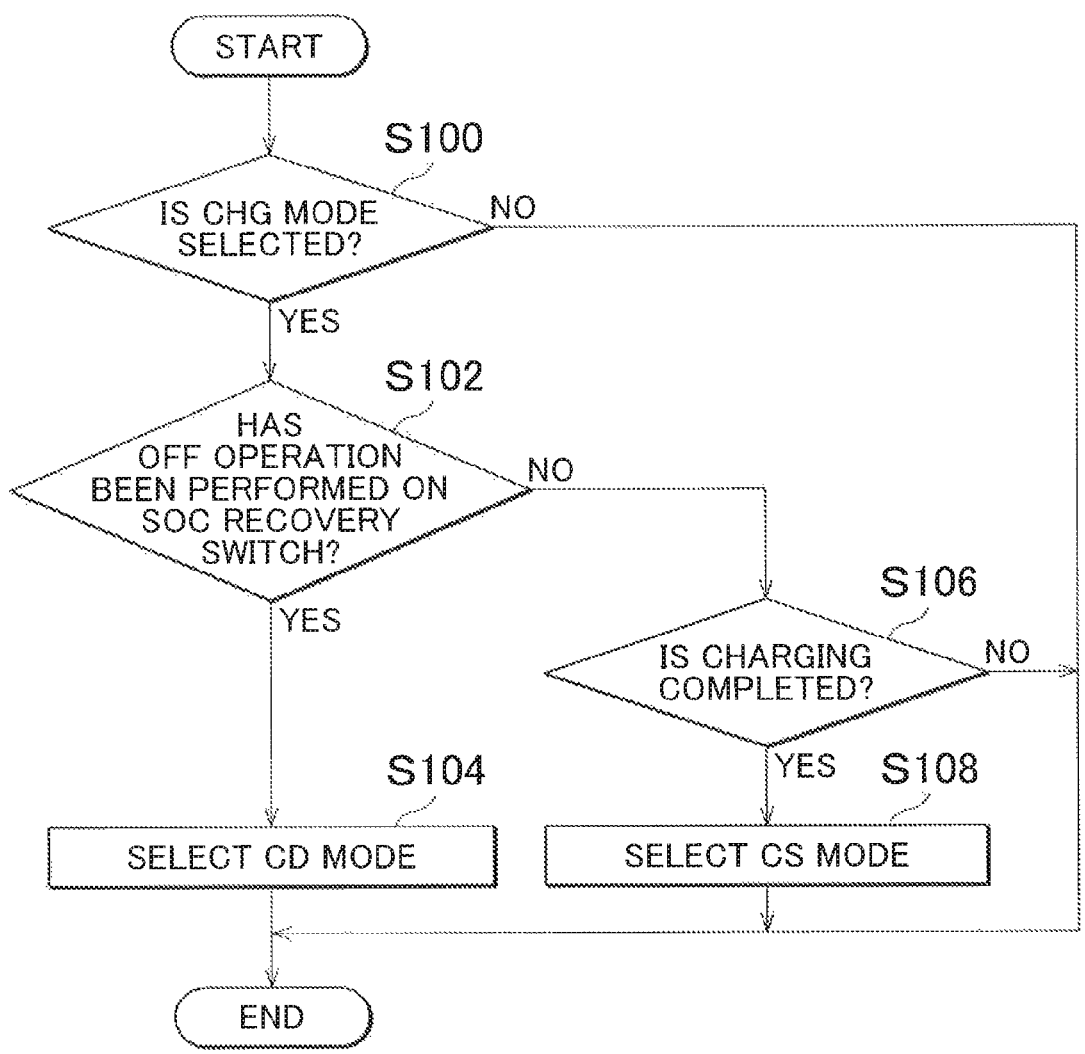
FIG. 4 is a flowchart illustrating control processing executed by the ECU.

Control processing executed by the ECU 200 that is mounted on the vehicle 1 according to this embodiment will be described with reference to FIG. 4.

In Step (hereinafter, the Step will be referred to as S) 100, the ECU 200 determines whether or not the CHG mode is selected. In a case where it is determined that the CHG mode is selected (YES in S100), the processing proceeds to S102. Otherwise (NO in S100), this processing is terminated.

In S102, the ECU 200 determines whether or not the OFF operation has been performed on the SOC recovery switch 150. In a case where it is determined that the OFF operation has been performed on the SOC recovery switch 150 (YES in S102), the processing proceeds to S104. Otherwise (NO in S102), the processing proceeds to S106.

S104, the ECU 200 selects the CD mode as the control mode. In S106, the ECU 200 determines whether or not the charging of the battery 70 based on the SOC recovery control is completed. In a case where it is determined that the charging of the battery 70 based on the SOC recovery control is completed (YES in S106), the processing proceeds to S108. Otherwise (NO in S106), this processing is terminated. In S108, the ECU 200 selects the CS mode as the control mode.

The operation of the ECU 200 that is mounted on the vehicle 1 according to this embodiment will be described with reference to FIG. 5 and based on the structure and flowchart described above.

Figure 5:
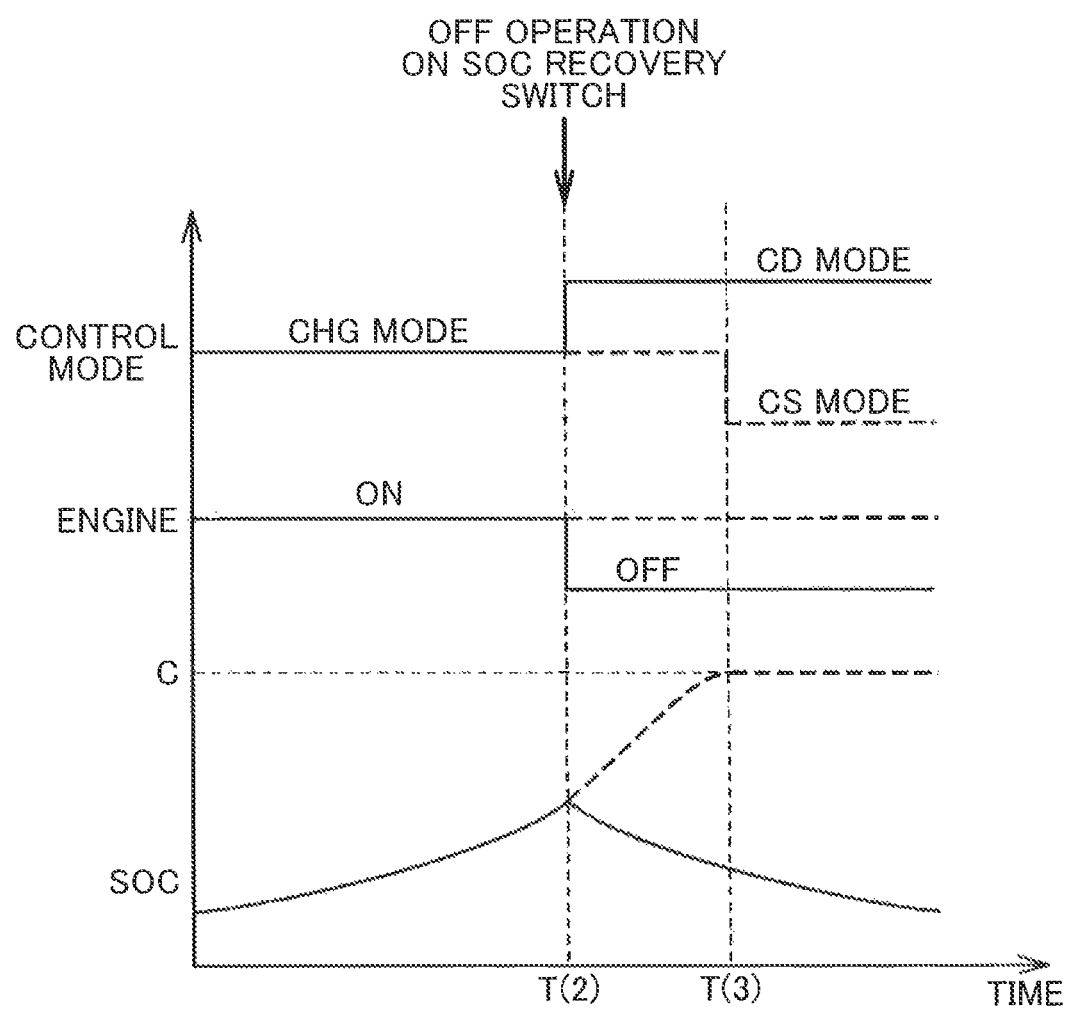
FIG. 5 is a timing chart illustrating the operation of the ECU.

As an example, a case will be assumed where the vehicle 1 is operated in a state where the CHG mode is selected as illustrated in FIG. 5. The engine 10 is in an operating state (ON state) since the SOC recovery control is being executed.

Until time T(2), the OFF operation is not performed on the SOC recovery switch 150 (NO in S102) with the CHG mode selected (YES in S100). Accordingly, the CHG mode is maintained.

In a case where the OFF operation is performed on the SOC recovery switch 150 (YES in S102) while the CHO mode is selected (YES in S100) at time T(2), the CD mode is selected as the control mode (S104) as illustrated by the solid line in the upper graph in FIG. 5. The selection of the CD mode causes the operation of the engine 10 to be determined by the start threshold of the engine 10 with regard to the vehicle power demand which corresponds to the CD mode. As a result, the engine 10 is stopped at time T(2) as illustrated by the solid line in the graph in the middle of FIG. 5.

The stopping of the SOC recovery control causes the charging of the battery 70 to be stopped. In addition, since the selection of the CD mode causes the electric power of the battery 70 to be consumed, the SOC is reduced with time after time T(2) as illustrated by the solid line in the graph in the bottom of FIG. 5.

In a case where the OFF operation is not performed on the SOC recovery switch 150 (NO in S102) while the CHG mode is selected (YES in S100) at time T(2), the selection of the CHG mode is maintained even after time T(2). Accordingly, the SOC of the battery 70 increases with time based on the SOC recovery control as illustrated by the dashed line in the graph in the bottom of FIG. 5.

In a case where the charging of the battery 70 based on the SOC recovery control is completed (YES in S106) at time T(3), the CS mode is selected as the control mode (S108) as illustrated by the dashed line in the upper graph in. FIG. 5. The selection of the CS mode causes the SOC of the battery 70 to be maintained after time T(3), and the operation of the engine 10 is determined by the start threshold of the engine 10 with regard to the vehicle power demand which corresponds to the CS mode. As a result, the operation state of the engine 10 continues after time T(2) as illustrated by the dashed line in the graph in the middle of FIG. 5.

As described above, according to the vehicle 1 of this embodiment, the CD mode in which the electric power of the battery 70 is consumed is selected in a case where the SOC recovery control is requested to be stopped by using the SOC recovery switch 150 during the execution of the SOC recovery control, and thus the charging of the battery 70 using the power of the engine 10 is suppressed. Accordingly, the operation of the engine 10 can be more limited (for example, the operation of the engine 10 is stopped and the state where the operation of the engine 10 is stopped is maintained) than in a case where the CS mode is selected. In other words, the operation of the engine 10 can be limited to suit the intention of the user. Accordingly, it is possible to provide a hybrid vehicle that limits the operation of the operating engine to suit the intention of the user in a case where the charging of the electric power storage device using the engine is requested to be stopped.

In addition, the SOC of the battery 70 can be maintained in the vicinity of the upper limit value since the CS mode is selected in a case where the SOC of the battery 70 reaches the full charging threshold C during the execution of the SOC recovery control. Accordingly, the electric power of the battery 70 can be used for the traveling of the vehicle 1, the operation of electrical equipment connected to the battery 70 and positioned in a passenger compartment or outside the vehicle, or the like at a timing desired by the user.

A modification example will be described below. In the description of this embodiment, the CS mode is selected in a case where the SOC of the battery 70 reaches the full charging threshold C as a result of the execution of the SOC recovery control. However, the invention is not particularly limited thereto. For example, the ECU 200 may select the CS mode in a case where the OFF operation is performed on the SOC recovery switch 150 after the SOC of the battery 70 reaches the full charging threshold C as a result of the execution of the SOC recovery control.

In the description of this embodiment, the CS mode is selected in a case where the SOC of the battery 70 reaches the full charging threshold C as a result of the execution of the SOC recovery control. However, the invention is not particularly limited thereto. In a case where the SOC of the battery 70 reaches the full charging threshold C as a result of the execution of the SOC recovery control and the vehicle is malfunctioning, for example, the ECU 200 may select any one of the CS mode and the CD mode depending on the malfunctioning part.

As another example, the ECU 200 may select the CS mode in a case where the SOC of the battery 70 reaches the full charging threshold C as a result of the execution of the SOC recovery control and malfunctioning has occurred to block the discharging of the battery 70 (for example, failure of the second MG 30 and the battery 70). Alternatively, the ECU 200 may select the CD mode, giving priority to electric power consumption, in a case where, for example, the SOC of the battery 70 reaches the full charging threshold C as a result of the execution of the SOC recovery control and malfunctioning has occurred to block the charging of the battery 70 (for example, failure of the first MG 20 and the engine 10). In this case, self-traveling to a repair plant or the like is allowed in the case of malfunctioning of the vehicle 1, and thus an appropriate control mode can be selected depending on the malfunctioning part.

In the description of this embodiment, the SOC recovery switch 150 is hardware. However, for example, the execution of the SOC recovery control may be requested by performing a touch operation on a predetermined area on a touch panel that overlaps with an image which corresponds to the SOC recovery switch 150 and is shown on a display with the touch panel being arranged on a front surface of the display or the execution of the SOC recovery control may be requested by using voice input means or the like.

In the description of this embodiment, the SOC recovery control is executed when the CHG mode is selected. However, for example, the SOC recovery control may also be executed as a type of control in the CS mode using an unusual SOC target value.

In the description of this embodiment, the CD mode is selected in a case where the SOC recovery control is requested to be stopped by using the SOC recovery switch 150 during the execution of the SOC recovery control. However, for example, the starting of the engine 10 may be prohibited until a predetermined period of time elapses while the CD mode is selected. In this case, it can be ensured that the operation of the engine 10 is limited in a case where the OFF operation is performed on the SOC recovery switch 150 during the execution of the SOC recovery control. The modification example described above may be implemented in part or in whole.

It should be noted that the embodiment disclosed herein is exemplary in every aspect and does not limit the invention. The scope of the invention is clarified by the claims, not the description above, and the invention includes any change within the meaning and range equivalent to the claims.

According to the aspect of the invention, the charge depleting mode in which the electric power of the electric power storage device is consumed is selected in a case where the recovery control is requested to be stopped by using the switch during the execution of the recovery control. Accordingly, the charging of the electric power storage device using the power of the engine is suppressed with priority given to electric vehicle (EV) traveling that is traveling in a state where the engine is stopped. Accordingly, the operation of the engine can be more limited (for example, the operation of the engine is stopped and the state where the operation of the engine is stopped is maintained) than when the charge sustaining mode is selected. In this manner, the operation of the engine can be limited to suit the user's intention.

According to the aspect of the invention, the charge sustaining mode is selected when the electric power storage amount reaches the upper limit value during the execution of the recovery control. Accordingly, the electric power storage amount can be maintained in the vicinity of the upper limit value. Then, the electric power of the electric power storage device can be used at a timing desired by the user.

According to the aspect of the invention, the charge sustaining mode is selected when the recovery control is requested to be stopped by using the switch after the electric power storage amount reaches the upper limit value during the execution of the recovery control. Accordingly, the electric power storage amount can be maintained in the vicinity of the upper limit value. Accordingly, the electric power of the electric power storage device can be used at a timing desired by the user.

According to the aspect of the invention, for example, the charge sustaining mode, in which the operation of the engine is performed with high frequency, can be selected when malfunctioning has occurred to block the discharging of the electric power storage device (for example, failure of the rotary electric machine and the electric power storage device). In addition, the charge depleting mode can be selected, with priority given to the consumption of the electric power of the electric power storage device (operation of the rotary electric machine), when malfunctioning has occurred to block the charging of the electric power storage device (for example, failure of the electric power generation device and the engine). In this case, self-traveling to a repair plant or the like is allowed in the case of malfunctioning of the vehicle, and thus an appropriate control mode can be selected depending on the malfunctioning part.

What is claimed is:

1. A hybrid vehicle comprising:
   an engine;
   a rotary electric machine configured to be a driving source for the hybrid vehicle;
   an electric power storage device configured to supply electric power to the rotary electric machine;

an electric power generation device configured to generate electric power for charging the electric power storage device by using the power of the engine;

a switch for a user to operate when the user requires recovery control to be executed or stopped, the recovery control being control for increasing an electric power storage amount of the electric power storage device to an upper limit value by using the electric power generation device; and an ECU configured to (a) select any one of a plurality of control modes, the control modes including a charge sustaining mode and a charge depleting mode, the charge sustaining mode being a mode in which a reduction in the electric power storage amount is suppressed, and the charge depleting mode being a mode in which the electric power of the electric power storage device is consumed, (b) control the hybrid vehicle in accordance with the selected control mode, and (c) select the charge depleting mode when the recovery control is requested to be stopped by using the switch during the execution of the recovery control.

2. The hybrid vehicle according to claim 1 wherein the ECU selects the charge sustaining mode when the electric power storage amount reaches the upper limit value as a result of the execution of the recovery control.

3. The hybrid vehicle according to claim 1 wherein the ECU selects the charge sustaining mode when the recovery control is requested to be stopped by using the switch after the electric power storage amount reaches the upper limit value as a result of the execution of the recovery control.

4. The hybrid vehicle according to claim 1 wherein the ECU selects any one of the charge sustaining mode and the charge depleting mode depending on a malfunctioning part of the hybrid vehicle when the electric power storage amount reaches the upper limit value during the execution of the recovery control and the malfunctioning part is present in the hybrid vehicle.

5. A hybrid vehicle comprising:

an engine;

a rotary electric machine configured to be a driving source for the hybrid vehicle;

an electric power storage device configured to supply electric power to the rotary electric machine;

an electric power generation device configured to generate electric power for charging the electric power storage device by using the power of the engine;

a switch configured to transmit a signal when the switch is operated, the switch being a switch operated by a user; and an ECU configured to (a) select any one of a plurality of control modes, (b) control the hybrid vehicle in accordance with the selected control mode, the control modes including a charge sustaining mode and a charge depleting mode, the charge sustaining mode being a mode in which a reduction in the electric power storage amount is suppressed, and the charge depleting mode being a mode in which the electric power of the electric power storage device is consumed, (c) receive the signal, (d) execute a recovery control when the signal is a first signal, the first signal being a signal for requesting the recovery control to be executed, the recovery control being control for increasing an electric power storage amount of the electric power storage device to an upper limit value, (e) stop the recovery control when the signal is a second signal, the second signal being a signal for requesting the recovery control to be stopped, and (f) select the charged depleting mode when the second signal is received during the execution of the recovery control.

6. A hybrid vehicle comprising:

an engine;

a motor-generator configured to supply electric power by using the power of the engine;

an electric power storage device configured to store the electric power generated by the motor-generator; and an electric control unit configured to select any one of a plurality of control modes, the control modes including i) a charge sustaining mode sustaining an amount of the electric power stored in the electric power storage device, ii) a charge depleting mode consuming the electric power stored in the electric power storage device, and iii) a charge increasing mode increasing the amount of the electric power stored in the electric power storage device, wherein the electronic control unit is configured to select the charge depleting mode when cancelling the charge increasing mode is requested by a user during the charge increasing mode being selected.

7. The hybrid vehicle according to claim 6, wherein the electronic control unit is configured to select the charge sustaining mode when increasing the amount of the electric power stored in the electric power storage is completed during the charge increasing mode being selected.

8. The hybrid vehicle according to claim 6, wherein the electronic control unit is configured to select the charge sustaining mode when increasing the amount of the electric power stored in the electric power storage is completed and canceling the charge increasing mode is requested during the charge increasing mode being selected.

9. The hybrid vehicle according to claim 6, wherein the electronic control unit is configured to select the charge sustaining mode or the charge depleting mode in accordance with a malfunction of the hybrid vehicle when increasing the amount of the electric power stored in the electric power storage is completed and the hybrid vehicle has the malfunction.

* * * * *